United States Patent
Kumar et al.

(10) Patent No.: US 10,331,978 B2
(45) Date of Patent: Jun. 25, 2019

(54) METHOD AND A SYSTEM FOR GENERATING A MULTI-LEVEL CLASSIFIER FOR IMAGE PROCESSING

(71) Applicant: Wipro Limited, Bangalore (IN)

(72) Inventors: Sendil Kumar Jaya Kumar, Bangalore (IN); Sujatha Jagannath, Bangalore (IN)

(73) Assignee: Wipro Limited, Bangalore (IN)

( * ) Notice: Subject to any disclaimer, the term of this patent is extended or adjusted under 35 U.S.C. 154(b) by 9 days.

(21) Appl. No.: 15/459,251

(22) Filed: Mar. 15, 2017

(65) Prior Publication Data

US 2018/0218240 A1  Aug. 2, 2018

(30) Foreign Application Priority Data

Jan. 31, 2017  (IN) .............................. 201741003649

(51) Int. Cl.
G06K 9/00  (2006.01)
G06K 9/62  (2006.01)
G06K 9/46  (2006.01)
G06K 9/03  (2006.01)

(52) U.S. Cl.
CPC ....... *G06K 9/6267* (2013.01); *G06K 9/00684* (2013.01); *G06K 9/036* (2013.01); *G06K 9/4604* (2013.01); *G06K 9/6227* (2013.01); *G06K 9/4619* (2013.01)

(58) Field of Classification Search
None
See application file for complete search history.

(56) References Cited

U.S. PATENT DOCUMENTS 8,655,803 B2  2/2014 Lecerf et al.
9,779,492 B1 *  10/2017 Garnavi ................ G06T 7/0002
2009/0076996 A1  3/2009 Hull et al.
(Continued)

FOREIGN PATENT DOCUMENTS

WO  WO 2005/017831  2/2005
WO  WO 2005/096226  10/2006

OTHER PUBLICATIONS

Extended European Search Report issued in the European Patent Office in counterpart European Application No. 1713905.7, dated Oct. 17, 2017, 8 pages.

*Primary Examiner* — Hadi Akhavannik
(74) *Attorney, Agent, or Firm* — Finnegan, Henderson, Farabow, Garrett & Dunner, LLP

(57) ABSTRACT

The present disclosure is related in general to image processing and a method and system for generating a multi-level classifier for image processing. An image processing system may analyze an input image of a predetermined image type to extract unique key feature descriptors associated with the input image. Further, the unique key feature descriptors are resized into a predefined standard template format which is utilized to develop an image type classifier. Furthermore, the unique key feature descriptors are resized into each of one or more template classifiers of the predetermined image type. Further, signal quality value of each of the template classifiers is determined by validating each of the unique key feature descriptors resized based on each of the template classifiers and an image prediction classifier is developed based on the signal quality value.

19 Claims, 5 Drawing Sheets

(56) References Cited

U.S. PATENT DOCUMENTS

| | | | |
|---|---|---|---|
| 2009/0125510 A1 | 5/2009 | Graham et al. | |
| 2012/0249725 A1* | 10/2012 | Corcoran | G06T 3/0062 |
| | | | 348/36 |
| 2012/0249726 A1* | 10/2012 | Corcoran | G06T 3/0062 |
| | | | 348/36 |
| 2012/0321142 A1 | 12/2012 | Trojanova et al. | |
| 2012/0321175 A1 | 12/2012 | Hedau et al. | |
| 2013/0064441 A1 | 3/2013 | Kask | |
| 2014/0078320 A1 | 3/2014 | Hong | |
| 2017/0270653 A1* | 9/2017 | Garnavi | G06T 7/0002 |
| 2017/0364766 A1* | 12/2017 | Das | G06K 9/4628 |

\* cited by examiner

METHOD AND A SYSTEM FOR GENERATING A MULTI-LEVEL CLASSIFIER FOR IMAGE PROCESSING

TECHNICAL FIELD

The present subject matter relates generally to image processing, and more particularly, but not exclusively to a method and a system for generating a multi-level classifier for image processing.

BACKGROUND

Generally, an image of high quality may contain noise. Larger image data with few unique features may include noise from various sources and would require extensive processing. Therefore, providing input images comprising noisy signals with very few unique features to any image classifier will mislead the image classifier thereby degrading the prediction accuracy of the performance in the image classifier.

Due to the presence of such noisy signals in the image, usage of any type of image classifier for one or more applications such as detecting location finder using image similarity in satellite images, detecting patterns on availability of natural resources based on image similarity patterns in satellite images, detecting image similarities from larger image databases such as income tax department, finance service providers, bank, insurance agencies, forensics, state agencies and the like results in low prediction accuracy. There might be a substantial need for manual intervention for detecting image type and image similarity. In scenarios where large volumes of images need to be processed, more man hours and also more man power may be required. Further, due to the manual intervention many faults and errors may occur in image type and image similarity detection.

Existing techniques find matches and similarities based on distance measure of features present in query image and features present in pre-stored images. However, distance measure identifies semi-identical images or a near match but cannot find the accurate results. In few existing techniques that use image classifiers, due to the presence of noisy signals in the image, use of any image classifier to predict image similarity poses a larger challenge due to low prediction accuracy of the image classifiers.

SUMMARY

One or more shortcomings of the prior art are overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for generating a multi-level classifier for image processing. The method includes analysing, by an image processing system, an input image to extract one or more unique key feature descriptors associated with the input image. The input image may be of a predetermined image type. Further, the image processing system resizes the one or more unique key feature descriptors into a predefined standard template format. The predefined standard template format may be utilized to develop an image type classifier. Furthermore, the image processing system resizes the one or more unique key feature descriptors based on each of one or more template classifiers of the predetermined image type. Further, the image processing system determines a signal quality value for each of the one or more template classifiers. The signal quality value is determined by validating each of the one or more unique key feature descriptors resized based on each of the one or more template classifiers. Finally, the image processing system identifies one of the one or more image template classifiers corresponding to a highest signal quality value. The identified one of the one or more template classifiers is utilized to develop an image prediction classifier of the image processing system.

Further, the present disclosure includes an image processing system for generating a multi-level classifier for image processing. The image processing system includes a processor and a memory communicatively coupled to the processor. The memory stores the processor-executable instructions, which, on execution, causes the processor to analyse an input image to extract one or more unique key feature descriptors associated with the input image. The input image is of a predetermined image type. Further, the processor resizes the one or more unique key feature descriptors into a predefined standard template format, wherein the predefined standard template format is utilized to develop an image type classifier. Furthermore, the processor resizes the one or more unique key feature descriptors based on each of one or more template classifiers of the predetermined image type. Further, the processor determines signal quality value for each of the one or more template classifiers. The signal quality value is determined by validating each of the one or more unique key feature descriptors resized based on each of the one or more template classifiers. Finally, the processor identifies one of the one or more template classifiers corresponding to a highest signal quality value. The identified one of the one or more template classifiers is utilized to develop an image prediction classifier of the image processing system.

Further, the present disclosure comprises non-transitory computer readable medium including instructions stored thereon that when processed by at least one processor causes an image processing system to perform operations comprising analysing an input image to extract one or more unique key feature descriptors associated with the input image. The input image is of a predetermined image type. Further, the instructions cause the processor to resize the one or more unique key feature descriptors into a predefined standard template format. The predefined standard template format is utilized to develop an image type classifier. Furthermore, the instructions cause the processor to resize the one or more unique key feature descriptors based on each of one or more template classifiers of the predetermined image type. Upon resizing, the instructions cause the processor to determine a signal quality value for each of the one or more template classifiers. The signal quality value is determined by validating each of the one or more unique key feature descriptors resized based on each of the one or more template classifiers. Finally, the instructions cause the processor to identify one of the one or more template classifiers corresponding to a highest signal quality value. The identified one of the one or more template classifiers is utilized to develop an image prediction classifier.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
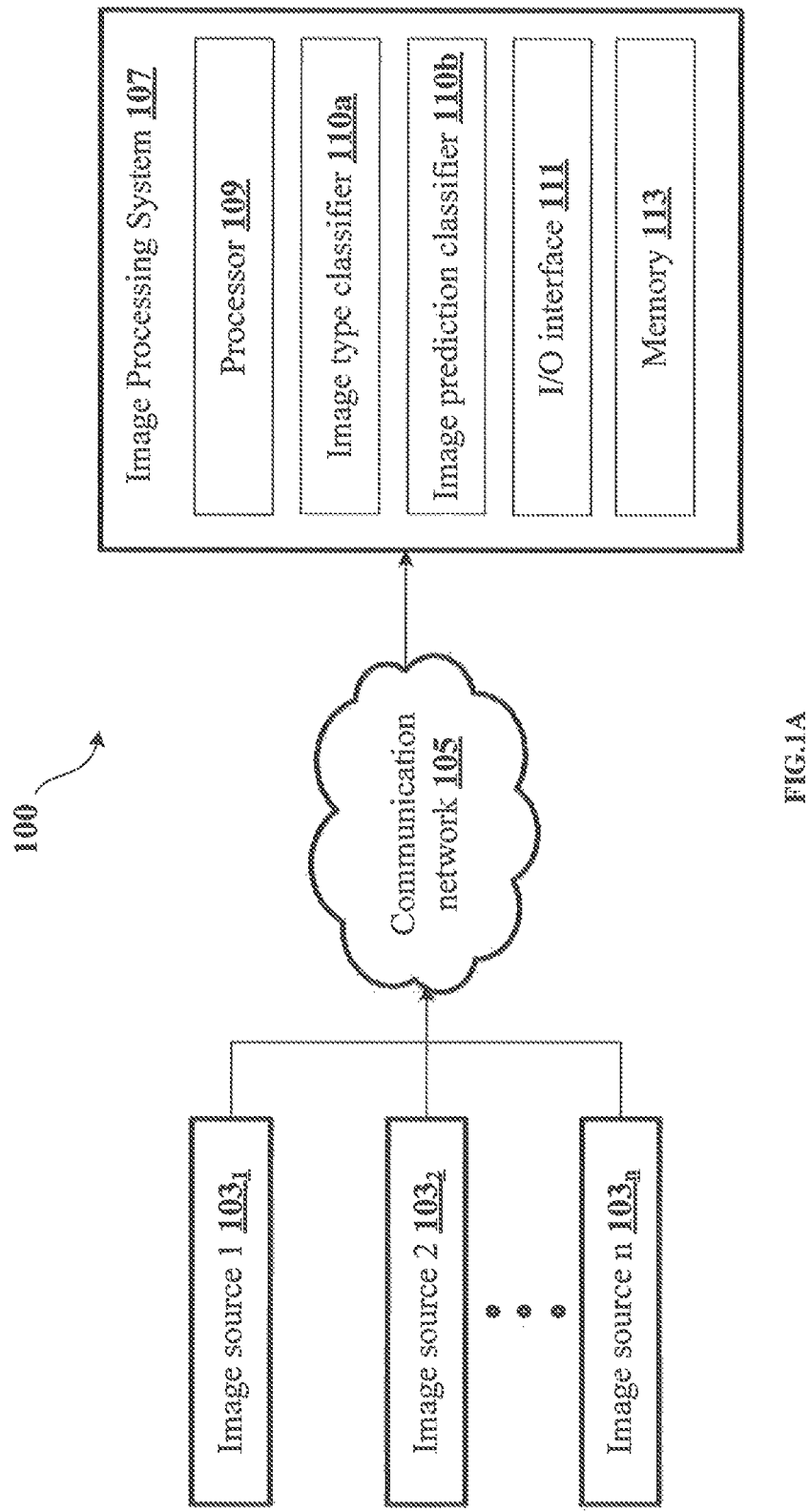
FIG. 1A shows an exemplary architecture for generating a multi-level classifier for image processing in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for generating multi-level classifier for image processing. The system i.e. the image processing system may include analysing an input image to extract one or more unique key feature descriptors associated with the input image. The input image may be of a predetermined image type. Further, the image processing system resizes the one or more unique key feature descriptors into a predefined standard template format. The predefined standard template format is utilized to develop an image type classifier. Furthermore, the image processing system resizes the one or more unique key feature descriptors based on each of one or more template classifiers of the predetermined image type. Each of the one or more template classifiers are associated with the unique image type. The one or more template classifiers may be dynamically generated by the image processing system. Further, the image processing system may determine signal quality value for each of the one or more template classifiers. The signal quality value may be determined by validating each of the one or more unique key feature descriptors resized based on each of the one or more template classifiers. Finally, the image processing system identifies one of the one or more template classifiers corresponding to highest signal quality value. The one of the one or more template classifiers may be utilized to develop or detect the best performing an image prediction classifier. Upon developing the image type classifier and the image prediction classifier, the image processing system performs predictive analysis of any new input image received by the image processing system. The present disclosure performs automatic noise removal and provides improvised acquisition of signal strength. Further, the present disclosure provides accurate results due to the use of multi-level classifiers for image processing and selection of best performing template classifier.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for generating a multi-level classifier for image processing in accordance with some embodiments of the present disclosure.

The architecture 100 may include one or more image sources, image source $103_1$ to image source $103_n$ (collectively referred to as one or more image sources 103), a communication network 105 and an image processing system 107. As an example, the one or more image sources 103 may include, but not limited to, an image repository and an image capturing device such as a camera, a mobile, a tablet and the like. The image processing system 107 interacts with the one or more image sources 103 via the communication network 105. The communication network 105 may be at least one of a wired communication network and a wireless communication network.

Figure 1B:
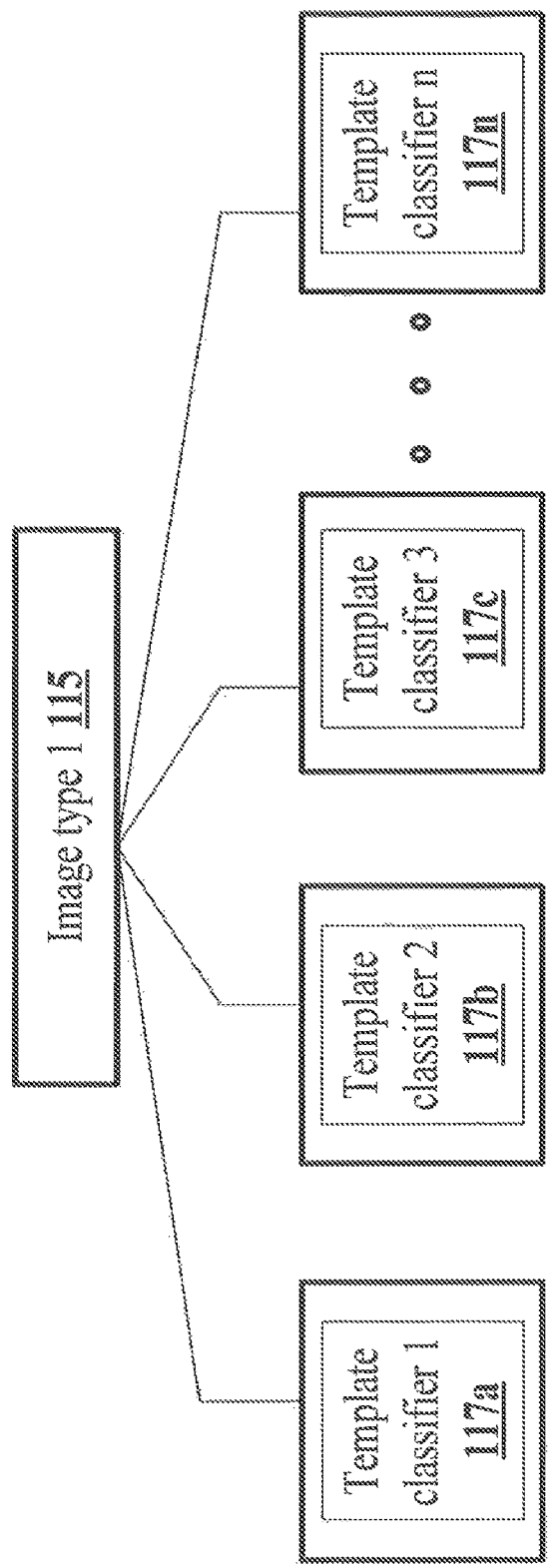
FIG. 1B shows an exemplary association of each of one or more template classifiers for an image type in accordance with some embodiments of the present disclosure.

The image processing system 107 includes a processor 109, an image type classifier 110a, an image prediction classifier 110b, an I/O interface 111 and a memory 113. The I/O interface 111 receives an input image from the one or more image sources 103. The input image is of a predetermined image type. As an example, the predetermined image types may include, but not limited to, images of phone bill, medical bill, passport and driver's license. In an embodiment, each of the predetermined image type is associated with each of predetermined one or more image type templates. Further, each of the predetermined image type is associated with one or more template classifiers. In an embodiment, the one or more template classifiers are dynamically generated by the processor 109. FIG. 1B illustrates exemplary template classifier 1 117*a* to template classifier n 117*n* that are dynamically generated for an exemplary image type 1 115. In some embodiment, each of the one or more template classifiers is created based on, but not limited to, one or more dimensions, one or more resolutions, signal strength of image key feature descriptors and one or more image properties. Further, as an example, the one or more image properties may include, but not limited to, contrast, brightness, saturation and depth. The processor 109 analyses the input image to extract one or more unique key feature descriptors from the input image. As an example, the one or more unique key feature descriptors may be dimensions of the input image, resolution of the input image, pattern of text in the input image, if any and the like. The processor 109 develops a first-level classifier referred to as an image type classifier 110*a* utilizing the extracted one or more unique key feature descriptors. In an embodiment, the image type classifier 110*a* may be used to identify image type of an image. Further, the processor 109 also develops a second-level classifier referred to as an image prediction classifier 110*b* utilizing the extracted one or more unique key feature descriptors. In some embodiment, the image prediction classifier 110*b* may be used to resize the image using an apt template classifier. The image type classifier 110*a* and the image prediction classifier 110*b* are configured in the image processing system 107. The image type classifier 110*a* and the image prediction classifier 110*b* together form a multi-level classifier for image processing. Upon developing the image type classifier 110*a* and the image prediction classifier 110*b*, the processor 109 performs predictive analysis of any new input image received by the I/O interface 111 through the developed image type classifier 110*a* and the image prediction classifier 110*b*.

Figure 2:
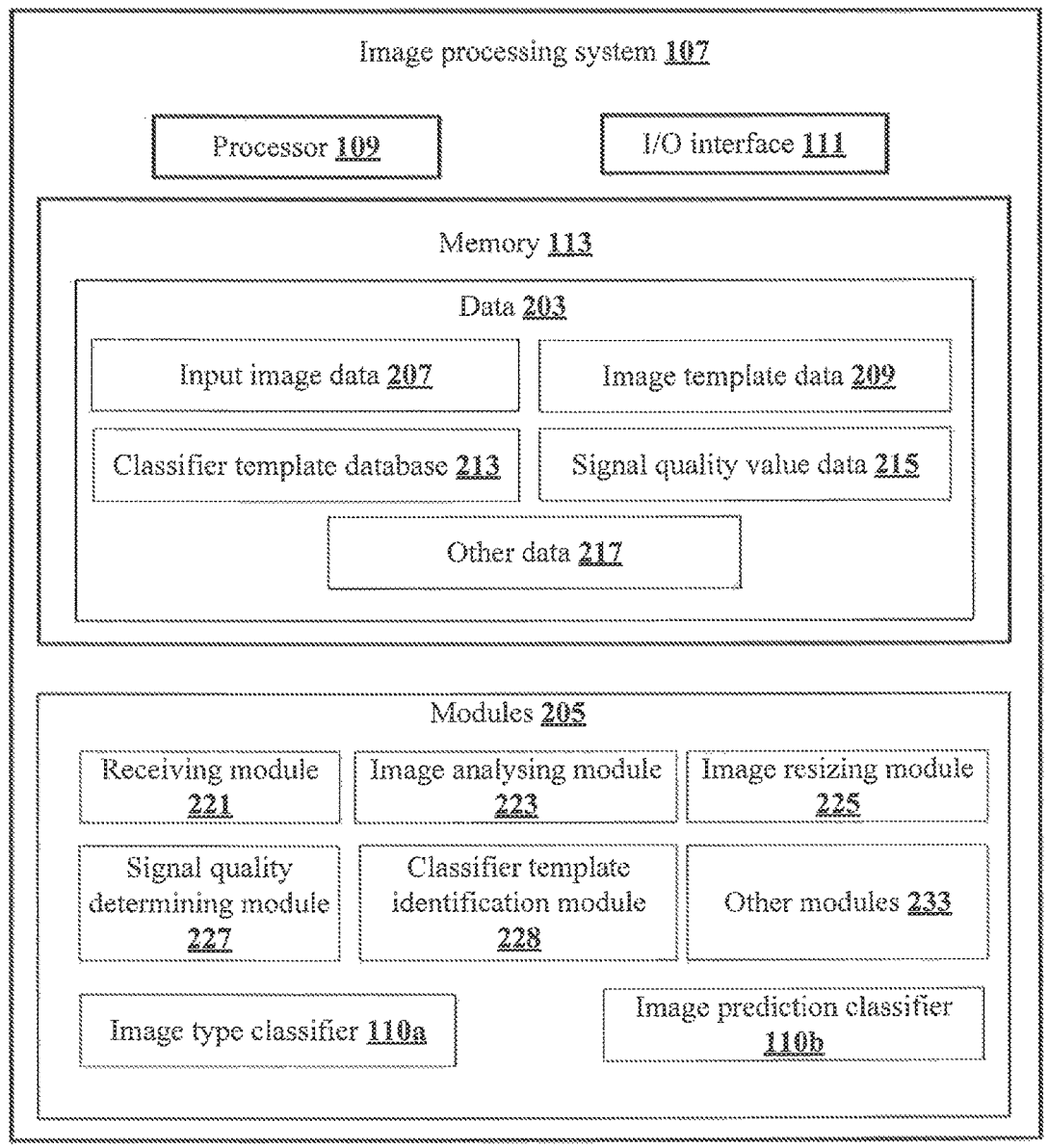
FIG. 2 shows a detailed block diagram of an image processing system for generating a multi-level classifier for image processing in accordance with some embodiments of the present disclosure.

FIG. 2 shows a detailed block diagram of an image processing system generating a multi-level classifier for image processing in accordance with some embodiments of the present disclosure.

In some implementation, the image processing system 107 may include data 203. As an example, the data 203 is stored in the memory 113 configured in the image processing system 107 as shown in the FIG. 2. In one embodiment, data 203 includes an input image data 207, an image type template data 209, a classifier template database 213, a signal quality value data 215 and other data 217. In the illustrated FIG. 2, modules 205 are described herein in detail.

In some embodiment, the data 203 may be stored in the memory 113 in the form of various data structures. Additionally, the data can be organized using data models, such as relational or hierarchical data models. The other data 217 may store data, including temporary data and temporary files, generated by modules 205 for performing the various functions of the image processing system 107.

In some embodiment, the input image data 207 may include one or more input images received by the image processing system 107 from one or more image sources 103.

As an example, the one or more image sources 103 may include, but not limited to, an image repository and an image capturing device such as a camera, a mobile, a tablet and the like. Further, the input image data 207 includes one or more unique key feature descriptors extracted from each of the one or more input images received by the image processing system 107.

In some embodiment, the image type template data 209 may include predetermined one or more image type templates. Each of the predetermined one or more image type templates correspond to at least one predetermined image type. As an example, the at least one predetermined image type may include, but not limited to, images of phone bill, medical bill, passport and driver's license.

In an embodiment, the classifier template database 213 may include one or more template classifiers i.e. one of the one or more template classifiers corresponding to the predetermined image type. In some embodiments, each of the one or more template classifiers is associated with a unique image type. Each of the one or more template classifiers is trained with a fixed image size template that is derived based on the one or more image properties and signal strength of image key features descriptors. Further, the one or more template classifiers covers a wide range of classifier template sizes for the given image type. In some embodiment, each of the one or more template classifiers is created based on, but not limited to, one or more dimensions, one or more resolutions, one or more image properties and signal strength of image key features descriptors. Further, as an example, the one or more image properties may include, but not limited to, contrast, brightness, saturation and depth.

In some embodiment, the signal quality value data 215 may include a signal quality value for each of the one or more template classifiers. The signal quality value indicates signal quality of an input image with respect to signal to noise ratio present in the input image. The signal-to-noise ratio is used in imaging as a physical measure of the sensitivity of an imaging system. In an embodiment, the imaging system may be a digital imaging system or a film imaging system.

In some embodiment, the data stored in the memory 113 is processed by the modules 205 of the image processing system 107. The modules 205 may be stored within the memory 113. In an example, the modules 205 communicatively coupled to a processor 109 configured in the image processing system 107, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, an image type classifier 110*a* and an Image prediction classifier 110*b* may be integrated as individual chips in the ASIC. In an embodiment, the image type classifier 110*a* and the image prediction classifier 110*b* may be integrated as a single chip in the ASIC, wherein the single chip is an association of both image type classifier 110*a* and the image prediction classifier 110*b*. In an embodiment, both the image type classifier 110*a* and the image prediction classifier 110*b* may be configured within the processor 109 and integrated in the ASIC.

In an embodiment, the modules 205 may include, for example, a receiving module 221, an image analysing module 223, an image resizing module 225, a signal quality determining module 227, a classifier template identification module 228, an image type classifier 110a, an image prediction classifier 110b and other modules 233. The other modules 233 may be used to perform various miscellaneous functionalities of the image processing system 107. It will be appreciated that such aforementioned modules 205 may be represented as a single module or a combination of different modules.

In some embodiment, the receiving module 221 receives an input image of the predetermined image type from the one or more image sources 103.

In some embodiment, the image analysing module 223 may analyse the input image received by the receiving module 221. The processor 109 extracts the one or more unique key feature descriptors from the input image. As an example, the one or more unique key feature descriptors may be dimensions of the input image, resolution of the input image, pattern of the text in the input image, if any and the like.

In some embodiment, the image resizing module 225 may resize the one or more detected unique key feature descriptors in the image into a predefined standard template format. The predefined standard template format may be of a predefined size, a predefined size derived using resolution, unique key feature descriptors, one or more image properties such as contrast, brightness, saturation, depth and the like. Further, the one or more unique key feature descriptors that are resized into the predefined standard template format are stored in the memory 113 corresponding to the predetermined image type of the input image, thereby developing an image type classifier 110a. In some embodiment, developing the image type classifier 110a, may include, but not limited to, training the image type classifier 110a based on the one or more unique key feature descriptors of the input image. Therefore, the image type classifier 110a may be capable of automatically identifying image type of a similar input image in future based on the one or more unique key features stored corresponding to the predetermined image type in the memory 113.

Further, the image resizing module 225 may resize the one or more unique key feature descriptors based on each of the one or more template classifiers. In some embodiment, the one or more template classifiers may be dynamically generated by the processor 109 for the predetermined image type of the input image. Therefore, resizing the one or more unique key feature descriptors based on each of the one or more template classifiers may involve resizing the one or more key feature descriptors of the input image into one or more unique key feature descriptors of each of the one or more template classifiers.

In some embodiment, the signal quality determining module 227 may determine a signal quality value for each of the one or more template classifiers obtained from the image resizing module 225. Each of the one or more unique key feature descriptors resized based on each of the one or more template classifiers are validated by the signal quality determining module 227. The signal quality determining module 227 performs validation with respect to signal to noise ratio. The signal quality determining module 227 assigns the signal quality value to each of the one or more template classifiers based on the signal-to-noise ratio. In an embodiment, the classifier template identification module 228 may identify one of the one or more template classifiers corresponding to the highest signal quality value among the signal quality values determined for each of the one or more template classifiers. The one of the one or more template classifier corresponding to the highest signal quality value is identified by ranking each of the one or more template classifiers based on the signal quality value determined for each of the one or more template classifiers. In some embodiment, the ranking may be in an ascending order or a descending order. As an example, consider the signal quality value of 5 Template classifiers as shown in the below Table 1a.

TABLE 1a

| Template classifier | Signal quality value (Out of 10) |
| --- | --- |
| Template classifier 1 | 5 |
| Template classifier 2 | 7 |
| Template classifier 3 | 2 |
| Template classifier 4 | 4 |
| Template classifier 5 | 3 |

Table 1b shows an exemplary ranking in descending order for the signal quality value determined for the 5 Template classifiers as shown in the above Table 1a.

TABLE 1b

| Template classifier | Ranking (descending order) |
| --- | --- |
| Template classifier 2 | Rank 1 |
| Template classifier 1 | Rank 2 |
| Template classifier 4 | Rank 3 |
| Template classifier 5 | Rank 4 |
| Template classifier 3 | Rank 5 |

As shown in the above Table 1b, the signal quality value "7" of the template classifier 2 is ranked as the highest signal quality value when compared to rest of the template classifiers. In some embodiment, the classifier template identification module 228 may retain the identified one of the one or more template classifiers in the classifier template database 213 and may discard rest of the one or more template classifiers. Further, the classifier template identification module 228 may associate the identified one of the one or more template classifiers to the predetermined image type of the input image thereby, developing the image prediction classifier 110b. As an example, in the above Table 1b, the template classifier 2 is retained and the rest of the template classifiers are discarded. In some embodiment, developing the image prediction classifier 110b, may include, but not limited to, training the image prediction classifier 110b with the identified one of the one or more template classifier corresponding to the highest signal quality value for each predetermined image type.

In some embodiment, the processor 109 may perform predictive analysis of a new input image received by the receiving module 221 using the developed image type classifier 110a and the image prediction classifier 110b. The image analysis module 223 may analyse the new input image to extract the one or more unique key feature descriptors associated with the new input image. As an example, the one or more unique key feature descriptors may include both a detector and a descriptor. The detector is based on the difference-of-Gaussians, which is an approximation of the Laplacian. The difference-of-Gaussians detector detects centres of blob-like structures. The unique key feature descriptor is based on a histogram of gradient orientations which are rotation-invariant. In an embodiment, rotation-invariant is a condition where same corners of an image is found even after rotating the image since corners remain corners in the rotated image as well. Further, the one or more unique key feature descriptors are scale invariant. Furthermore, the one or more unique key feature descriptors may also include dimensions of the input image, resolution of the input image, pattern of text in the input image, if any and the like. Further, the image resizing module 225 may resize the extracted one or more unique key features of the new input image into the predefined standard template format. In some embodiment, resizing includes converting the one or more unique key feature descriptors of the new input image into respective unique key feature descriptors of the predefined standard template format. Furthermore, the image resizing module 225 activates the image type classifier 110*a*.

In an embodiment, the image type classifier 110*a* may detect image type of the new input image. The image type classifier 110*a* may compare the predefined standard template format of the new input image with each of the predetermined one or more image type templates associated with each of the predetermined image type. Based on the comparison, the image type classifier 110*a* detects the image type of the new input image. Upon detecting the image type of the new input image, the image prediction classifier 110*b* identifies the one of the one or more template classifiers associated with the detected image type. Further, the image prediction classifier 110*b* activates the image resizing module 225 to resize the one or more unique key feature descriptors of the new input image based on the identified one of the one or template classifiers associated with the detected image type of the new input image.

In some embodiment, if the image type of the new input image is not being detected by the image type classifier 110*a*, then the image type classifier 110*a* and the image prediction classifier 110*b* will be automatically trained/developed in real-time to process the new input image. The image type classifier 110*a* and the image prediction classifier 110*b* will be automatically trained/developed by following the process as described above with the help of various modules. Upon automatically training/developing the image type classifier 110*a* and the image prediction classifier 110*b*, the image type and the template classifier corresponding to the new input image may be updated in the image processing system 107.

Finally, the image analysis module 223 may analyse each of the one or more key feature descriptors resized based on the one of the one or more template classifiers with respect to one or more applications. As an example, the one or more applications may be identifying similarity of one or more images, identifying nearest match of the image, detecting image duplicates etc.

Henceforth, the process of image processing is explained with the help of one or more examples for better understanding of the present disclosure. However, the one or more examples should not be considered as limitation of the present disclosure.

Consider an exemplary scenario for developing an image type classifier 110*a* and an image prediction classifier 110*b* as shown in the below Table 2.

TABLE 2

| Input image | Unique Key Feature Descriptors (UKFD) | Predetermined image type | Predefined standard template (Resolution- 720*480 Dimensions- 80*100) of the input image | Image type classifier The UKFD of the input image are labelled using the image type identities | One or more Template Classifiers (TC) generated dynamically, one to many relationship | Image prediction classifier |
|---|---|---|---|---|---|---|
| Input image 1 | Input image 1 {UKFD 1.1 UKFD 1.2 UKFD 1.3} | Petrol bill (Label Type 1) | UKFDs of Input image 1 resized into predefined standard template | Image type 1- Petrol bill UKFD of Image type 1 - {UKFD 1.1 UKFD 1.2 UKFD 1.3} | TC 1.1 TC 1.2 TC 1.3 TC 1.4 TC 1.5 TC 1.6 | TC 1.3 associated with Image type 1 (Rest of the TCs are discarded) |
| Input image 2 | Input image 2 {UKFD 2.1 UKFD 2.2 UKFD 2.3} | Medical bill (Label Type 2) | UKFDs of Input image 2 resized into predefined standard template | Image type 2- Medical bill UKFD of Image type 2 - (UKFD 2.1 UKFD 2.2 UKFD 2.3} | TC 2.1 TC 2.2 TC 2.3 TC 2.4 TC 2.5 TC 2.6 | TC 2.5 associated with Image type 2 (Rest of the TCs are discarded) |
| Input image 3 | Input image 3 {UKFD 3.1 UKFD 3.2 UKFD 3.3} | Driver's license (Label Type 3) | UKFDs of Input image 3 resized into predefined standard template | Image type 3- Driver's license UKFD of Image type 3 - {UKFD 3.1 UKFD 3.2 UKFD 3.3} | TC 3.1 TC 3.2 TC 3.3 TC 3.4 TC 3.5 TC 3.6 | TC 3.1 associated with Image type 3 (Rest of the TCs are discarded) |

In the above Table 2 the image type classifier 110*a* and the image prediction classifier 110*b* are developed/trained to recognize input images of type "Petrol bill", "Medical bill" and "driver's license". According to Table 2, for the image type "Petrol bill", the one or more Template Classifiers (TC) are "TC 1.1", "TC 1.2", "TC 1.3", "TC 1.4", TC 1.5" and "TC 1.6". Among the 6 template classifiers, consider that the template classifier having highest signal quality value is "TC 1.3". Therefore, "TC 1.3" is associated with the image type "Petrol bill" and remaining 5 TCs are discarded. Similarly, the template classifier associated with the image type "Medical bill" is "TC 2.5" and the template classifier associated with the image type "Driver's license" is "TC 3.1". The retained template classifiers are labelled against unique labels derived using the medical bills or Driver license or petrol bills.

Consider a scenario where a new input image is provided for performing predictive analysis. The processor 109 analyses the new input image and extracts the one or more UKFDs of the new input image. The processor 109 extracts totally 3 UKFDs of the new input image. UKFD N.1, UKFD N.2 and UKFD N.3. The processor 109 resizes the UKFDs—UKFD N.1, UKFD N.2 and UKFD N.3 to the predefined standard template format. Upon resizing to the predefined standard template format, the image type classifier 110*a* compares the resized UKFDs with one or more predefined image type templates. The image type classifier 110a identifies that the UKFDs of the new input image are similar to the UKFDs of the input image 2 in the Table 2. Therefore, the image type classifier 110a identifies the image type of the new input image as image type 2 i.e. Medical bill. Upon identifying the image type, the image prediction classifier 110b identifies the TC associated with the image type "Medical bill". The image prediction classifier 110b identifies that the TC associated with the image type "Medical bill" is "TC 2.5". Consider that the TC 2.5 includes resolution 720*480 and dimensions 50*150. Therefore, the image prediction classifier 110b resizes the UKFDs of the new input image into "TC 2.5" having the resolution 720*480 and dimensions 50*150. Further, the resized UKFDs obtained using the image prediction classifier 110b are used for identifying the one or more applications.

Consider a scenario where the application is to identify a duplicate medical bill having the same bill number should be identified. Therefore, the label that is predicted against the resized UKFDs obtained using the image prediction classifier 110b are compared with an existing database to get entity information about the predicted label. The processor 109 identifies that the medical bill is a "XYZ hospital medical bill" based on the UKFDs of the input image and also, since the bill number of the medical bill is the same as the bill number of the bill in the existing database, the processor 109 identifies that duplicate bills exist for the given bill number.

Figure 3:
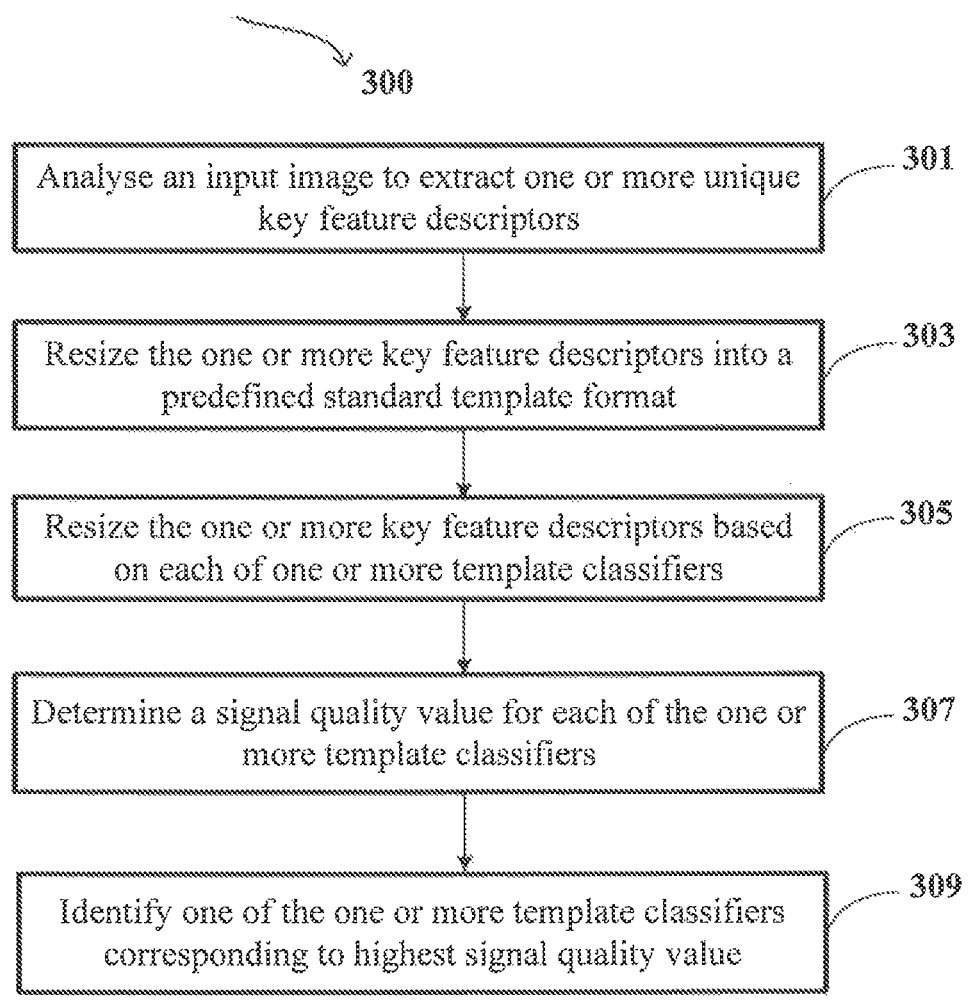
FIG. 3 shows a flowchart illustrating a method for generating a multi-level classifier for image processing in accordance with some embodiments of the present disclosure.

FIG. 3 shows a flowchart illustrating a method for generating a multi-level classifier for image processing in accordance with some embodiments of the present disclosure.

As illustrated in FIG. 3, the method 300 includes one or more blocks illustrating a method for generating a multi-level classifier for image processing. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, an input image of the predetermined image type is analysed. In some embodiment, a processor 109 of the image processing system 107 may analyse the input image received from one or more image sources. As an example, the one or more image sources 103 may include, but not limited to, an image repository and an image capturing device such as a camera, a mobile, a tablet and the like. The processor 109 may extract one or more unique key feature descriptors from the input image. As an example, the one or more key feature descriptors may be dimensions of the input image, resolution of the input image, pattern of the text in the input image, if any and the like.

At block 303, the one or more unique key feature descriptors may be resized into a predefined standard template format. Further, the one or more unique key feature descriptors that may be resized into the predefined standard template format are stored in the memory 113 corresponding to the predetermined image type of the input image, thereby developing an image type classifier 110a.

At block 305, the one or more unique key feature descriptors may be resized into each of one or more template classifiers. In some embodiment, the processor 109 dynamically generates the one or more template classifiers for the predetermined image type of the input image. Upon generating the one or more template classifiers, the one or more unique key feature descriptors are resized based on each of the one or more template classifiers of the predetermined image type.

At block 307, a signal quality value for each of the one or more template classifiers may be determined. The processor 109 may validate each of the one or more unique key feature descriptors resized into each of the one or more template classifiers with respect to signal to noise ratio. Upon validating, the processor 109 assigns the signal quality value to each of the one or more template classifiers based on the signal-to-noise ratio.

At block 309, one of the one or more template classifiers corresponding to highest signal quality value may be identified. The processor 109 may retain the one of the one or more template classifiers having the highest signal quality value and may discard rest of the one or more template classifiers. Further, the processor 109 associates the identified one of the one or more template classifiers with the predetermined image type of the input image thereby, developing an image prediction classifier 110b.

Upon developing the image type classifier 110a and the image prediction classifier 110b, the processor 109 may perform predictive analysis of any new input image received by the image processing system 107.

Figure 4:
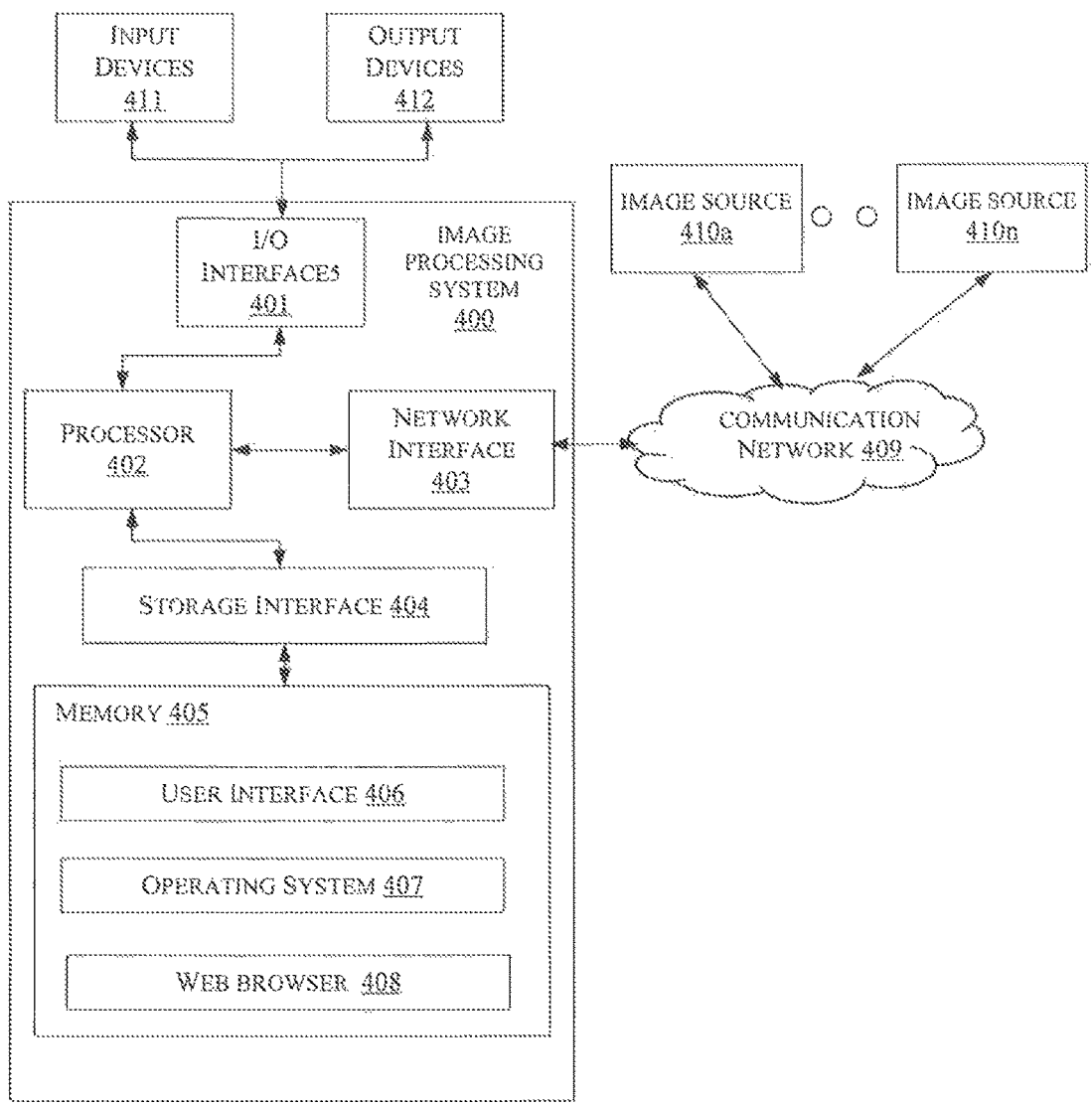
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the image processing system 400 is used for determining one or more requirements for a project. The image processing system 400 may include a central processing unit ("CPU" or "processor") 402. The processor 402 may include at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the image processing system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the image processing system 400 may communicate with one or more image sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more image sources 410 (a, . . . , n) may include, but not limited to, an image repository and an image capturing device such as a camera, a mobile, a tablet etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives and the like employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web browser 408 etc. In some embodiments, the image processing system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the image processing system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the image processing system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the image processing system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the image processing system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP). Simple Mail Transfer Protocol (SMTP), or the like. In some embodiments, the image processing system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein In an embodiment, the present disclosure provides a method and a system for generating a multi-level classifier for image processing. Image type classifier and image prediction classifier are automatically developed/trained by the image processing system.

The present disclosure provides a feature wherein the image processing system performs automatic noise removal and provides improvised acquisition of signal strength.

The present disclosure provides accurate results due to the use of multi-level classifiers for image processing.

The present disclosure requires very minimal human intervention as most of the process is automated.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a multi-level classifier for image processing. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
|---|---|
| 100 | Architecture |
| 103 | One or more image sources |
| 105 | Communication network |
| 107 | Image processing system |
| 109 | Processor |
| 110a | Image type classifier |
| 110b | Image prediction classifier |
| 111 | I/O interface |
| 113 | Memory |
| 115 | Image type 1 |
| 117a | Template classifier 1 |
| 117b | Template classifier 2 |
| 117c | Template classifier 3 |
| 117n | Template classifier n |
| 203 | Data |

-continued

| Reference Number | Description |
|---|---|
| 205 | Modules |
| 207 | Input image data |
| 209 | Image template data |
| 213 | Classifier template database |
| 215 | Signal quality value data |
| 217 | Other data |
| 221 | Receiving module |
| 223 | Image analysing module |
| 225 | Image resizing module |
| 227 | Signal quality determining module |
| 228 | Classifier template identification module |
| 233 | Other modules |

What is claimed is:

1. A method for generating a multi-level classifier for image processing, the method comprising:
    analysing, by an image processing system, an input image to extract one or more unique key feature descriptors associated with the input image, wherein the input image is of a predetermined image type;
    resizing, by the image processing system, the one or more unique key feature descriptors into a predefined standard template format, wherein the predefined standard template format is utilized to develop an image type classifier;
    resizing, by the image processing system, the one or more unique key feature descriptors based on each of one or more template classifiers of the predetermined image type, wherein the resizing based on each of one or more template classifiers comprises resizing the one or more unique key feature descriptors into one or more unique key feature descriptors of each of the one or more template classifiers;
    determining, by the image processing system, a signal quality value for each of the one or more template classifiers, wherein the signal quality value is determined by validating each of the one or more unique key feature descriptors resized based on each of the one or more template classifiers; and
    identifying, by the image processing system, one of the one or more template classifiers corresponding to a highest signal quality value, wherein the identified one of the one or more template classifiers is utilized to develop an image prediction classifier.

2. The method as claimed in claim 1 further comprises:
    associating, by the image processing system, the identified one of the one or more template classifiers with the predetermined image type, wherein the identified one of the one or more template classifiers is stored in a classifier template database; and
    discarding, by the image processing system, rest of the one or more template classifiers of the predetermined image type.

3. The method as claimed in claim 1, wherein one of the one or more template classifiers corresponding to the highest signal quality value is identified by ranking each of the one or more template classifiers based on the signal quality value determined for each of the one or more template classifiers.

4. The method as claimed in claim 1, wherein each of the one or more template classifiers are dynamically generated.

5. The method as claimed in claim 1, wherein each of the predetermined image type is associated with each of predetermined one or more image type templates.

6. The method as claimed in claim 1, wherein each of the one or more template classifiers is created based on at least one of, one or more dimensions, one or more resolutions and one or more image properties.

7. The method as claimed in claim 6, wherein the one or more image properties are at least one of contrast, brightness, saturation and depth.

8. The method as claimed in claim 1, wherein the image type classifier and the image prediction classifier are configured in the image processing system.

9. The method as claimed in claim 1 further comprises performing predictive analysis of a new input image, the method comprising:
   analysing, by the image processing system, the new input image to extract one or more unique key feature descriptors associated with the new input image;
   resizing, by the image processing system, the one or more unique key feature descriptors of the new input image into the predefined standard template format;
   detecting, by the image processing system, image type of the new input image by comparing the predefined standard template format of the new input image with each of predetermined one or more image type templates associated with each of the predetermined image type;
   resizing, by the image processing system, the one or more unique key feature descriptors of the new input image based on the one of the one or more template classifiers associated with the detected image type of the new input image; and
   analysing, by the image processing system, each of the one or more key feature descriptors resized into the one of the one or more template classifiers with respect to one or more applications.

10. An image processing system for generating a multi-level classifier for image processing, the image processing system comprising:
   a processor; and
   a memory communicatively coupled to the processor, wherein the memory stores the processor-executable instructions, which, on execution, causes the processor to:
      analyse an input image to extract one or more unique key feature descriptors associated with the input image, wherein the input image is of a predetermined image type;
      resize the one or more unique key feature descriptors into a predefined standard template format, wherein the predefined standard template format is utilized to develop an image type classifier;
      resize the one or more unique key feature descriptors based on each of one or more template classifiers of the predetermined image type, wherein the resizing based on each of one or more template classifiers comprises resizing the one or more unique key feature descriptors into one or more unique key feature descriptors of each of the one or more template classifiers;
      determine a signal quality value for each of the one or more template classifiers, wherein the signal quality value is determined by validating each of the one or more unique key feature descriptors resized based on each of the one or more template classifiers; and
      identify one of the one or more template classifiers corresponding to a highest signal quality value, wherein the identified one of the one or more template classifiers is utilized to develop an image prediction classifier.

11. The image processing system as claimed in claim 10, wherein the processor is further configured to:
   associate the identified one of the one or more template classifiers with the predetermined image type, wherein the identified one of the one or more template classifiers is stored in a classifier template database; and
   discard rest of the one or more template classifiers of the predetermined image type.

12. The image processing system as claimed in claim 10, wherein the processor identifies one of the one or more template classifiers corresponding to the highest signal quality value by ranking each of the one or more template classifiers based on the signal quality value determined for each of the one or more template classifiers.

13. The image processing system as claimed in claim 10, wherein the processor generates each of the one or more template classifiers are dynamically.

14. The image processing system as claimed in claim 10, wherein each of the predetermined image type is associated with each of predetermined one or more image type templates.

15. The image processing system as claimed in claim 10, wherein the processor creates each of the one or more template classifiers based on at least one of, one or more dimensions, one or more resolutions and one or more image properties.

16. The image processing system as claimed in claim 13, wherein the one or more image properties are at least one of contrast, brightness, saturation and depth.

17. The image processing system as claimed in claim 10, wherein the image type classifier and the image prediction classifier are configured in the image processing system.

18. The image processing system as claimed in claim 10, wherein the processor is further configured to perform predictive analysis of a new input image, that causes the processor to:
   analyse the new input image to extract one or more unique key feature descriptors associated with the new input image;
   resize the one or more unique key feature descriptors of the new input image into the predefined standard template format;
   detect image type of the new input image by comparing the predefined standard template format of the new input image with each of predetermined one or more image type templates associated with each of the predetermined image type;
   resize the one or more unique key feature descriptors of the new input image based on the one of the one or more template classifiers associated with the detected image type of the new input image; and
   analyse each of the one or more key feature descriptors resized into the one of the one or more template classifiers with respect to one or more applications.

19. A non-transitory computer readable medium including instructions stored thereon that when processed by at least one processor causes an image processing system to perform operations comprising:
   analysing an input image to extract one or more unique key feature descriptors associated with the input image, wherein the input image is of a predetermined image type;
   resizing the one or more unique key feature descriptors into a predefined standard template format, wherein the predefined standard template format is utilized to develop an image type classifier;

resizing the one or more unique key feature descriptors based on each of one or more template classifiers of the predetermined image type, wherein the resizing based on each of one or more template classifiers comprises resizing the one or more unique key feature descriptors into one or more unique key feature descriptors of each of the one or more template classifiers;

determining a signal quality value for each of the one or more template classifiers, wherein the signal quality value is determined by validating each of the one or more unique key feature descriptors resized based on each of the one or more template classifiers; and identifying one of the one or more template classifiers corresponding to a highest signal quality value, wherein the identified one of the one or more template classifiers is utilized to develop an image prediction classifier.

* * * * *